United States Patent [19]

Ikuta

[11] Patent Number: 5,058,447
[45] Date of Patent: Oct. 22, 1991

[54] CHANGE-SPEED CONSTRUCTION FOR FISHING REEL

[75] Inventor: Takeshi Ikuta, Sakai, Japan

[73] Assignee: Shimano Industrial Company Limited, Osaka, Japan

[21] Appl. No.: 619,909

[22] Filed: Nov. 30, 1990

[51] Int. Cl.⁵ .................. F16H 3/08; A01K 89/01
[52] U.S. Cl. ........................... 74/371; 74/372; 192/48.91; 192/96; 242/255
[58] Field of Search ............... 74/333, 369, 371, 372; 192/67 R, 108, 48.91, 96; 242/249, 255

[56]  References Cited

U.S. PATENT DOCUMENTS 4,867,392  9/1989  Sato .............................. 242/255 X

FOREIGN PATENT DOCUMENTS 63-163165  10/1988  Japan .

*Primary Examiner*—Dwight Diehl
*Attorney, Agent, or Firm*—Dickstein, Shapiro & Morin

[57]  ABSTRACT

A change-speed construction for a fishing reel. The construction has a cylindrical shaft for transmitting force from a handle arranged at an outer end position, a first gear rotatably fitted on the cylindrical shaft for high-speed winding, a second gear rotatably fitted on the cylindrical shaft for low-speed winding. The construction further has an engaging element for engaging either the first gear or the second gear for transmitting power from the cylindrical shaft, with the engaging element being slidable along an axis of the cylindrical shaft, an anti-slant portion having a slanting motion thereof restricted relative to the cylindrical shaft, and a posture maintaining mechanism including a portion attached to the anti-slant portion and a further portion attached to the engaging element. These portions come into sliding contact with either each other for preventing slant or 'twist' of the engaging element.

7 Claims, 4 Drawing Sheets

CHANGE-SPEED CONSTRUCTION FOR FISHING REEL

BACKGROUND OF THE INVENTION

1. Field of the Invention

The present invention relates to a change-speed construction for a fishing reel, and more particularly to a change-speed control construction for varying through a gear change-speed mechanism a spool revolution relative to a handle revolution.

2. Description of the Related Art

Many kinds of a change-speed construction are known, typically of a gear-shifting type and a clutch operation type where a clutch incorporated in a gear transmission unit is actuated for a change speed. For minimizing space for accommodating this construction, as shown in FIG. 4, the prior art has further suggested use of a cylindrical, i.e. hollow shaft type transmission shaft so that an inner control shaft accommodated therein is pushed or pulled for a change speed.

In this construction of FIG. 4, a cylindrical shaft 5' coupled with a line-winding handle 4' rotatably mounts a first gear 6' for high-speed winding and a second gear 7' for low-speed winding. Also, the cylindrical shaft 5' slidably mounts, as its innermost end thereof, an engaging element 10' which is axially moved by a control shaft 12' fitted inside the cylindrical shaft 5', and the engaging element 10' is urged by means of compression springs 11a' and 11b' adapted for positioning. A member 18' mounting gears 8' and 9' meshing with the first and second gears 6' and 7' is operatively associated with a spool 3' via a drag mechanism B'.

In operation of this FIG. 4 construction, power transmission is established through engagement of the engaging element 10' into an engaging hole 6a' of the first gear 6' or an engaging hole 7a' of the second gear 7'. Accordingly, for e.g. operating the engaging element 10' from the high-speed side to the low-speed side (in FIG. 4, from its position shown to a leftward position), the control shaft 12' is pushed to move the engaging element 10', through the urging force of the compression spring 11b', into abutment against a lateral face of the second gear 7'. Thereafter, the element 10' reaches its engaging position when the element 10' comes into phase alignment with the engaging hole 7a' of the second gear 7'.

Also, for an operation to the opposite direction too, the element 10' reaches its engaing position through the urging force of the compression spring 11a'.

This construction utilizing the engagement of the engaging element into the engaging hole has the problem of incomplete engagement. That is, when the engaging element is slanted, the element may be inadvertently retained at an incomplete engagement condition with only one end thereof being engaged into the hole while the other end remaining free. This condition is shown in FIG. 5.

More particularly, with this conventional construction, the urging force of the compression springs are used for operating the engaging element. Thus, if the posture of the element is slanted or 'twisted' for some reason, the spring uring force alone can not bring the element into complete engagement.

If power transmission is forcibly attempted under such incomplete engagement, the engaging element and/or the engaging holes will be damaged. Or, in the worst occasion, the engaging element may be locked thus completely disabling the operation.

The prior art discloses an alterante construction where the engaging element is not operated through a spring urging force. This construction, however, requires that the user rotate the handle while he manually keeps on pushing or urging the shaft until complete engagement is established. This is very troublesome.

Taking the above-state of the art into consideration, in a change-speed construction for a fishing reel where a spring urging force is used for operating an engaging element, the invention has provided rational improvement which enables smooth operation free from mechanical damage.

SUMMARY OF THE INVENTION

For accomplishing the above-noted object, a change-speed construction for a fishing reel, according to the invention, comprises: a cylindrical shaft for transmitting force from a handle arranged at an outer end position; a first gear rotatably fitted on the cylindrical shaft for high-speed winding; a second gear rotatably fitted on the cylindrical shaft for low-speed winding; an engaging element for engaging either the first gear or the second gear for transmitting power from the cylindrical shaft, the engaging element being slidable along an axis of the cylindrical shaft; an anti-slant portion having a slanting motion thereof restricted relative to the cylindrical shaft; and posture maintaining means including a portion attached to the anti-slant portion and a further portion attached to the engaging element, the portions coming into sliding contact with either each other for preventing slant of the engaging element.

According to the above-described features of the invention, since the engaging element is supported to the anti-slant portion through the posture maintaining means, there occurs no slanting motion of the engaging element relative to the cylindrical shaft. Moreover, since the two portions of this posture maintaining means come into sliding contact with each other along the axial direction, any slanting tendency of the engaging element during its movement can be surely prevented. Therefore, the construction can effectively avoid mechanical damage of the change-speed unit due to the above-described 'twist'. Further, the construction provides smooth and reliable change-speed operation even if the urging force of the spring used for moving the engaging element is reduced.

According to one preferred embodiment of the invention, the posture maintaining means includes a cylindrical member and a shaft member fitted inside the cylindrical member to be axially slidable relative thereto, with the cylindrical member and the shaft member extending toward an engagement side. With this construction, the cylindrical member and the shaft extend relative to each other for the mutual engagement. Accordingly, it becomes advantageously possible to retain a long stroke for the sliding contact within a limited space, thus further reliably preventing slant of the engaging element.

Further, for operating the engaging element, it is also conceivable to provide a control shaft slidably fitted inside the cylindrical shaft. With this arrangement, the engaging element slidably extending through the inside of the cylindrical shaft can be operated within the interior of the cylindrical shaft. Thus, the arrangement can achieve space economy as well.

Further and other objects, features and effects of the invention will become more apparent from the following more detailed description of the embodiments of the invention with reference to the accompanying drawings.

BRIEF DESCRIPTION OF THE DRAWINGS

Accompanying drawings FIGS. 1 through 3 show one preferred embodiment of a change-speed construction for a fishing reel according to the present invention; in which, FIG. 1 is a section view of the reel, FIG. 2 is a partial section showing a condition where a cotrol shaft is pushed for a change-speed operation, and FIG. 3 is an exploded perspective view showing a first gear, a second gear and an engaging element, separately, FIGS. 4 and 5 show the prior art; in which, FIG. 4 is a section view of a conventional construction, and FIG. 5 is a section view of the conventional construction troubled with incomplete engagement.

DESCRIPTION OF THE PREFERRED EMBODIMENTS

Preferred embodiments of the invention will now be described in particular with reference to the accompanying drawings.

Figure 1:
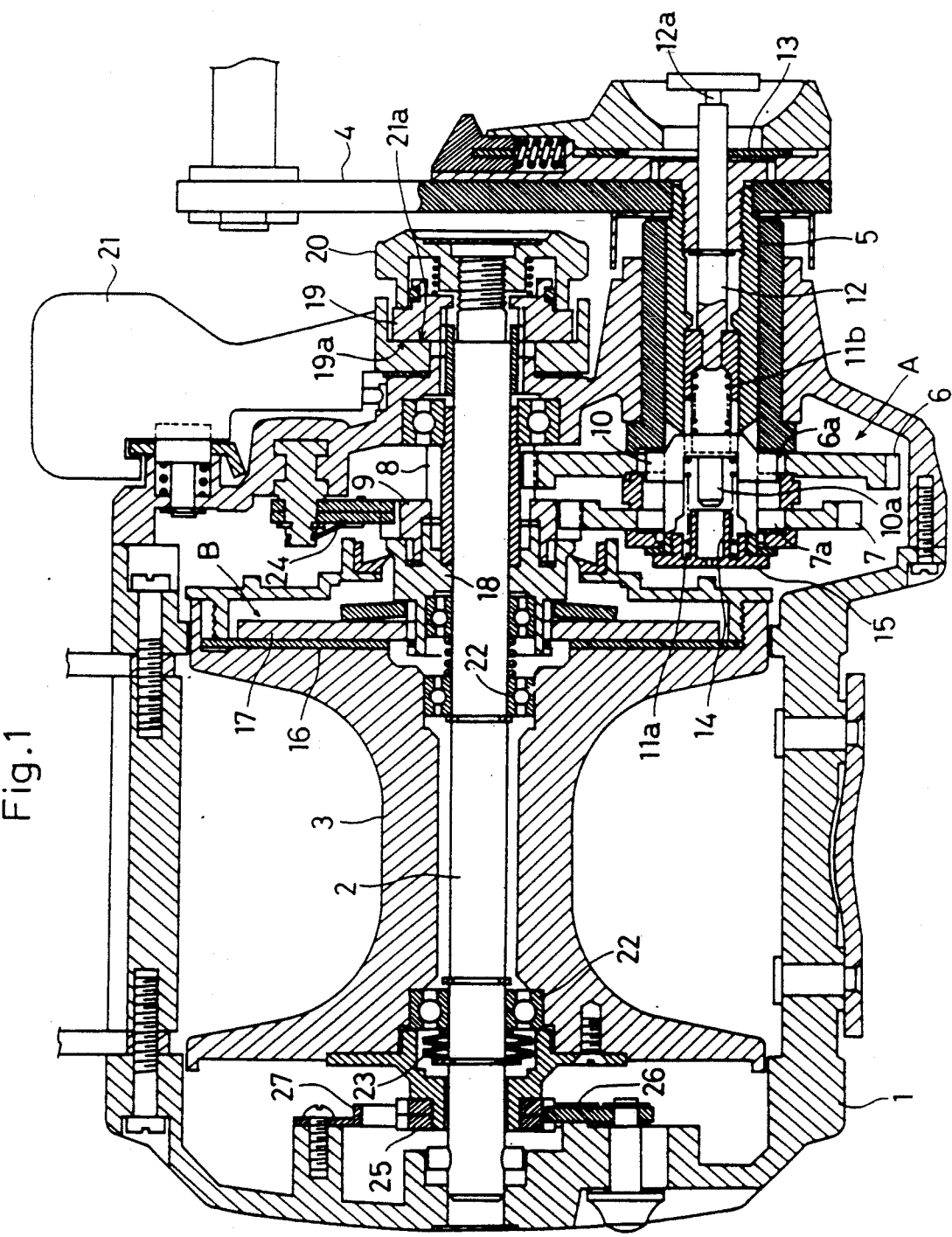
Figure 2:
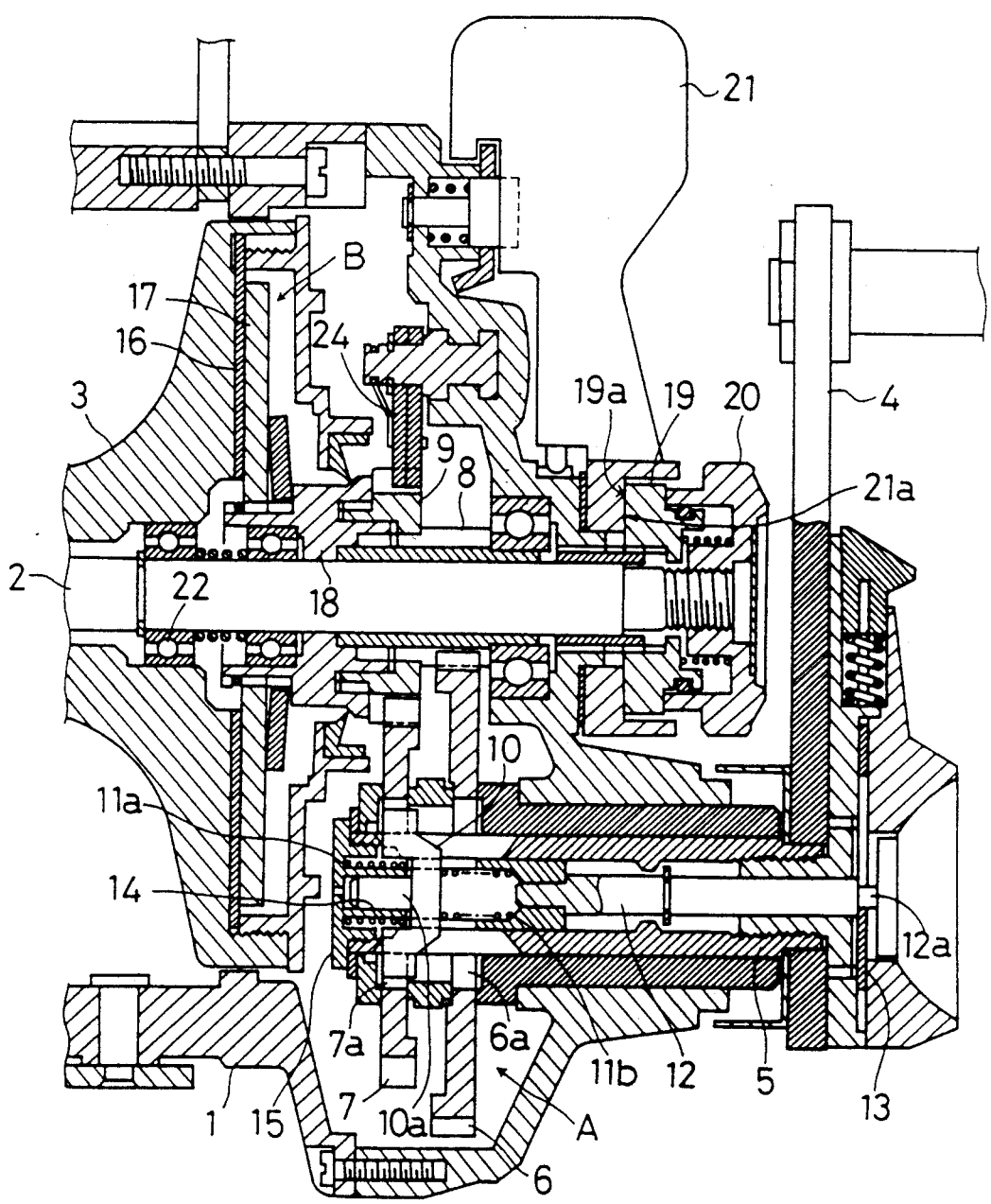

Referring to FIG. 1, a fishing reel includes a line-winding spool 3 rotatably fitted on a support shaft 2 disposed laterally inside a reel body 1, a gear change-speed mechanism A operatively coupled with a handle 4 for transmitting force from the handle 4 to a cylindrical shaft 5 and a transmission unit for transmitting the force through a drag mechanism B to the spool 3.

The gear change-speed mechanism A includes a first gear 6 for high-speed winding and a second gear 7 for low-speed winding, with both gears 6, 7 being rotatably fitted on the cylindrical shaft 5. The mechanism A further includes third and fourth gears 8, 9 rotably fitted on the support shaft 2 and meshing with the first and second gears 6 and 7; an engaging element 10 slidably supported to the cylindrical shaft 5 and engageable into engaging holes 6a, 7a of the first and second gears 6, 7 for transmitting the force from the cylindrical shaft 5 to either the first gear 6 or the second gear 7; a pair of compression springs 11a, 11b for positioning the engaging element 10; and a control shaft 12 for setting the position of the engaging element 10. In the condition shown in FIG. 1, where the control shaft 12 is pulled, the urging force of the compression spring 11(a) causes the engaging element 10 to come into engagemenet with the engaging hole 6a of the first gear 6. Conversely, if the control shaft 12 is pushed, the other inner-side compression spring 11(a) is compressed, whereby the urging force of the outer-side compression spring 11(b) causes the engaging element 10 to engage with the engaging hole 7a of the second gear 7.

The control shaft 12 defines a groove 12a at an outer end thereof and a sliding type stopper 13 is attached to the handle 4. Hence, when the control shaft 12 is pushed, its engagement with the stopper 13 maintains the pushed condition of the control shaft 12. Also, if the engaging element 10 and the engaging hole 7a of the second gear 7 are out of phase from each other, the engaging element 10 is maintained to remain at contact with a lateral face of the second gear 7. Then, when the phase alignment is established through a rotational operation on the handle 4, the urging force of the compression spring 11b serves to complete the engagement.

Figure 3:
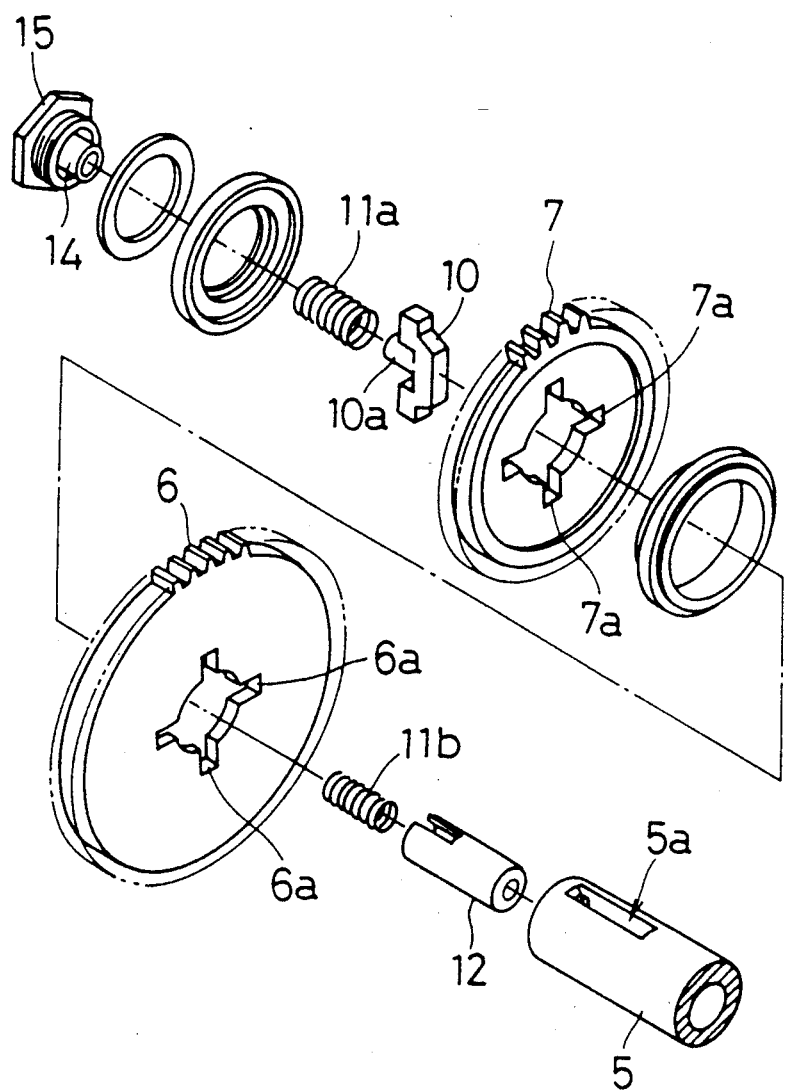
Figure 4:
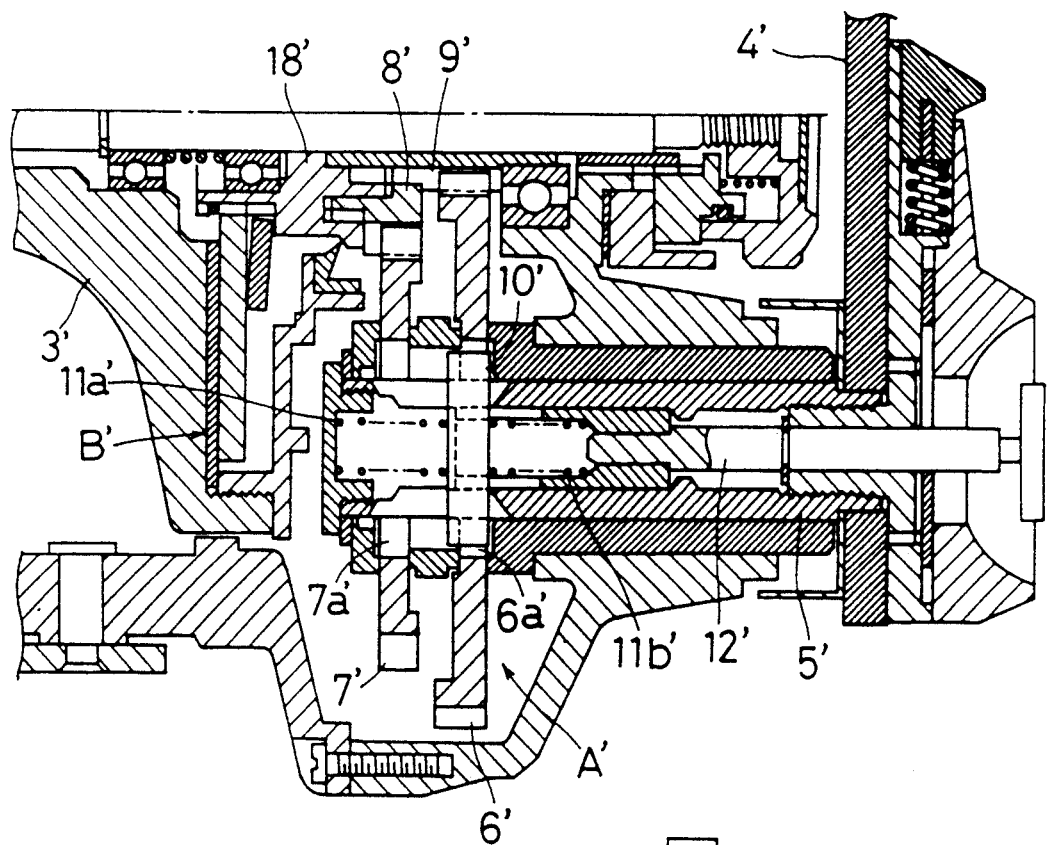
Figure 5:
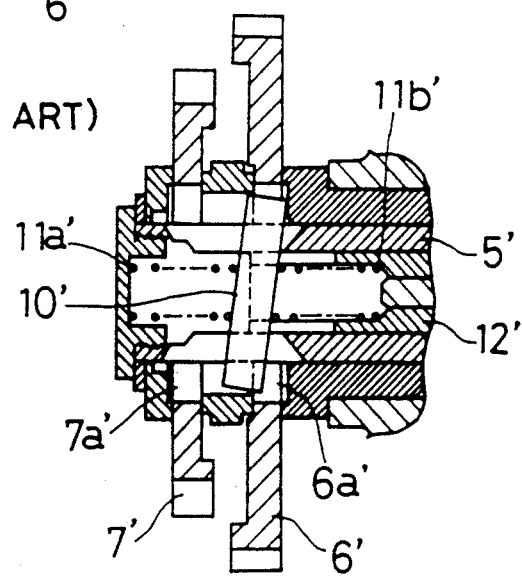

Further, with this gear change-speed mechanism A, as shown now in FIG. 3, the engaging element 10 is guided by a slit 5a defined in the periphery of the cylindrical shaft 5. Therefore, while a slanting motion (twisting motion along the rotational direction) of the engaging element 10 on a plane normal to the axis of the cylindrical shaft 5 can be effectively prevented as the element 10 comes into contact with the inner face of the slit 5a, the engaging element 10 tends to be slanted on a further plane across which the axis of the cylindrical shaft 6 extends.

For preventing the latter slant, the engaging element 10 includes, inside the cylindrical shaft 5, a projection 10a axially projecting toward the inner end of the cylindrical shaft 5. On the other hand, a cylindric posture maintaining member 14 is provided for preventing the slant of the engaging element 10 as the member 14 comes into sliding contact with the projection 10a when the engaging element 10 is moved towards the inner end of the cylindrical shaft 5. These projection 10a and the posture maintaining member 14 together constitute a posture maintaining means.

In this particular embodiment, the above posture maintaining means is formed integrally with a spring receiver 15 screwed to the inner end of the cylindrical shaft 5.

The drag mechanism B includes a friction plate 16 attached to a lateral face of the spool 3 and a disk 17 to come into pressed contact with the friction plate 16. The disk 17 is fitted on a transmission member 18 to be rotatable in unison. The transmission member is operatively associated with the third and fourth gears 8 and 9. Next, a drag adjustment operation, i.e. adjustment of the frictional force, of this drag mechanism B will be described.

On a handle-side end of the support shaft 2, there is screwed a rotary knob 20 for adjusting a position of a cam member 19 disposed coaxially with the support shaft 2. Between the cam member 19 and the reel body 1, there is interposed a drag lever 21 swingable about the same axis as the support shaft 2. The spool 3 is freely rotatably fitted on the support shaft 2 via bearings 22, 22 while its movement towards the opposite-side to the handle being restricted by means of a disc spring 23.

Further, the cam member 19 and the drag lever 21 contact through raised contact faces 19a, 21a (i.e. cam faces). Accordingly, with a swing operation of the drag lever 21, the support shaft 2 is slided relative to the reel body 1.

Then, for adjustment of the frictional force of this drag mechanism B, the rotary knob 20 is actuated for appropriately positioning the cam member 19 and the drag lever 21 is actuated. With this, if the support shaft 2 is now pulled towards the handle side, the spool 3 is moved towards the disc 17, thus increasing the frictional force. Conversely, if the support shaft 2 is pushed towards the opposite side, the frictional force of the drag mechanism B is reduced. Or, the frictional force becomes zero to permit free rotation of the spool 3.

Also, a ratchet claw 24 is provided for preventig reverse rotation of the support shaft 2. And, at the opposite end of the spool 3 relative to the handle 4, there is provided a further mechanism comprised of a gear element 25, an engaging claw 26 engageable with the gear element 25 and a 'C'-shaped spring element 27 for supporting the claw 26 to the reel body 1, so that this mechanism generates a clicking sound with the rotation of the spool 3.

OTHER EMBODIMENTS

Some other embodiments of the present invention will be specifically described next.

I. The cylindrical shaft need not be directly connected with the handle.

II. In place of the foregoing embodiment, in the posture maintaining means, the projection 10a can be formed with the spring receiver 15 while the posture maintaining member 14 is provided to the engaging element 10.

III. For embodying the posture maintaining means, the anti-slant portion can comprise e.g. the control shaft 12 or the cylindrical shaft per se.

IV. Further, the posture maintaining means can comprise a combination of a shaft and an associated hole.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A change-speed construction for a fishing reel, the construction comprising:
    a cylindrical shaft for transmitting force from a handle arranged at an outer end position;
    a first gear rotatably fitted on said cylindrical shaft for high-speed winding;
    a second gear rotatably fitted on said cylindrical shaft for low-speed winding;
    an engaging element for engaging either said first gear or said second gear for tranmitting power from said cylindrical shaft, said engaging element being slidable along an axis of said cylindrical shaft;
    an anti-slant portion having a slanting motion thereof restricted relative to said cylindrical shaft; and
    posture maintaining means including a portion attached to said anti-slant portion and a further portion attached to said engaging element, said portions coming into sliding contact with either each other for preventing slant of said engaging element.

2. A change-speed construction according to claim 1, wherein said posture maintaining means includes a cylindrical member and a shaft member fitted inside said cylindrical member to be axially slidable relative thereto, with said cylindrical member and said shaft member extending toward an engagement side.

3. A change-speed construction according to claim 2, wherein said cylindrical member is associated with said cylindrical shaft while said shaft member is associated with said shaft member.

4. A change-speed construction according to claim 3, wherein said shaft member comprises a projection axially projecting toward an inner end of said cylindrical shaft and said cylindrical member comprises a posture maintaining member for preventing slant of said engaging element as said maintaining member comes into sliding contact with said projection when said engaging element is moved towards the inner end of said cylindrical shaft.

5. A change-speed construction according to claim 4, wherein said anti-slant protion is fixed to said cylindrical shaft.

6. A change-speed construction according to claim 5, wherein said anti-slant portion comprises a spring receiver fixed to the inner end of said cylindrical shaft, a compression spring being provided for urging said engaging element toward an outer end of said cylindrical shaft, said posture maintaining member being attached to said spring receiver and inserted through said compression spring.

7. A change-speed construction according to claim 1, further comprising:
    a control shaft slidable fitted inside said cylindrical shaft for controlling said engaging element.

* * * * *